May 27, 1930.   J. E. EHRET   1,760,126
DRAIN TRAP
Filed May 29, 1929
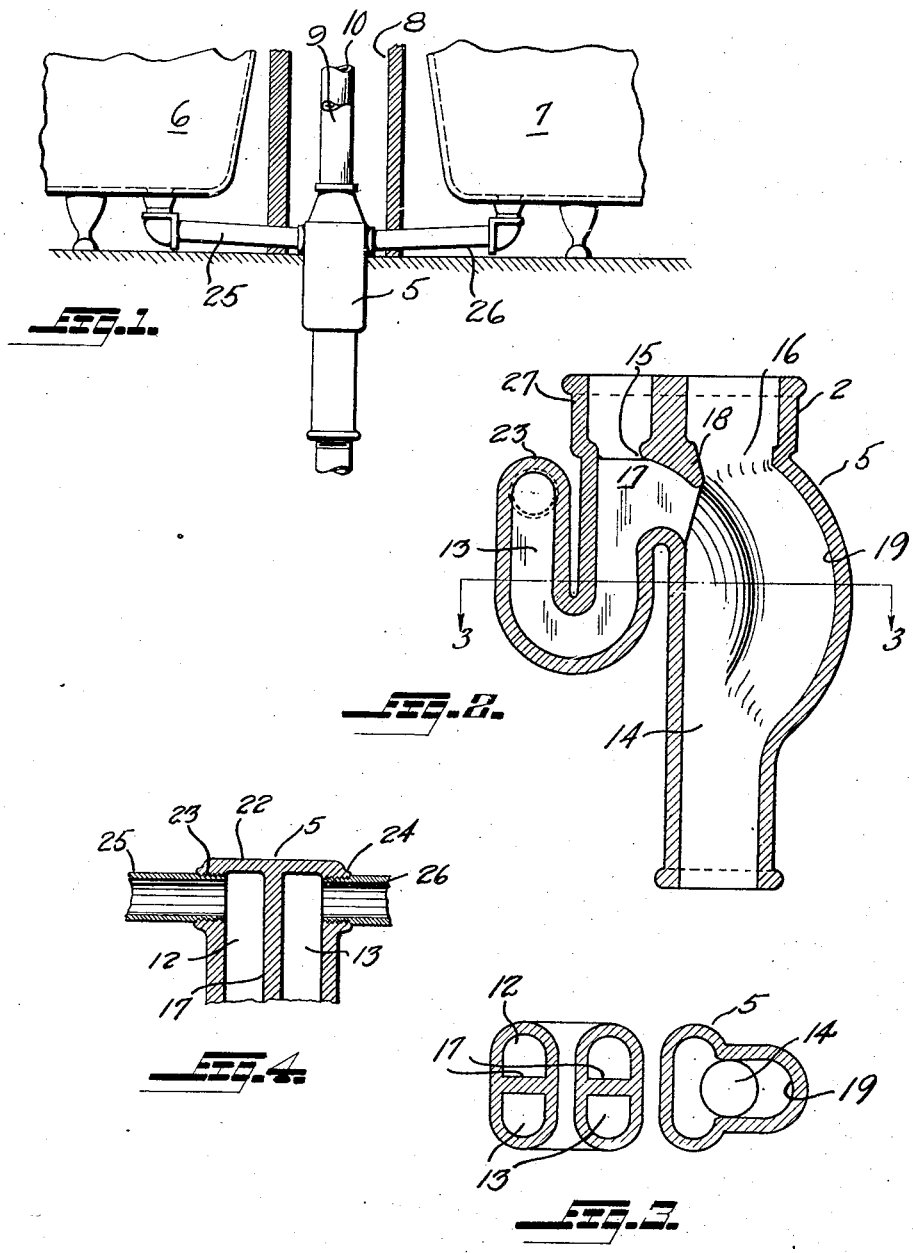
INVENTOR.
JOHN E. EHRET
BY Joseph B. Gardner
ATTORNEY.

Patented May 27, 1930

1,760,126

UNITED STATES PATENT OFFICE

JOHN E. EHRET, OF BERKELEY, CALIFORNIA

DRAIN TRAP

Application filed May 29, 1929. Serial No. 366,820.

This invention relates to improvements in drain traps for bath tubs, wash basins, kitchen sinks, and like equipment.

An object of the invention is to provide a double drain trap which as a single simply constructed device will efficiently serve as a trap for a plurality of bath tubs or like receptacles and thereby provide for saving in time, labor, material and plumbing costs as compared to installations requiring a separate drain trap for each tub or other receptacle to be drained.

Another object of the invention is to provide a double trap drain fitting of the character described which is constructed and arranged to positively prevent siphoning of the traps thereof.

Another object is to provide a drain trap of the character described which will not clog at or around the vent opening thereof nor in any way interfere with the proper venting of the trap.

A further object is to provide a drain trap of the character described in which provision is made for a novel and convenient interconnecting of two and more traps in order to save labor and material and reduce the costs of installation thereof.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawing:

Figure 1 is a sectional view showing one way of installing the device of my invention to serve two bath tubs.

Figure 2 is a side elevation of the trap of my invention.

Figure 3 is a sectional view taken on the plane of line 3—3 of Figure 2.

Figure 4 is a vertical section showing the intake ends of the traps.

In the present embodiment of my invention the drain trap device 5 is shown as installed to serve two bath tubs 6 and 7, the trap being located in wall or partition 8 which separates the rooms containing the bath tubs. A vent pipe 9 is connected with the trap 5 as is customary in the art. A continuation waste line pipe 10 may be employed as shown in Figure 1 to connect the trap 5 with other traps, not shown, and which will be located on floors above the trap 5, whereby the installation of several traps will be simplified and the cost thereof reduced.

As here shown, the trap device 5 of my invention preferably comprises a substantially S shaped body which is cast to provide two U shaped trap chambers or passages 12 and 13, a downwardly extending discharge passage 14 contiguous with certain ends of the trap passage, an upwardly extending vent passage 15 registering with the trap passages and an upwardly extending continuation waste line passage 16 registering and disposed in line with the upper end of the discharge passage.

The two trap chambers or passages 12 and 13 are formed by a wall or partition 17, the upper end of which extends into the vent passage 15. A similar web or portion 18 separates the passages 15 and 16 and is formed integral with an upper part of the partition 17. This wall is inclined toward the passage 16 so as to act as a deflector and direct the drainage from the pipe 10 away from juncture of the discharge passage 14 and the trap passages 12 and 13. It will be noted that the passage 14 is provided with a laterally offset portion 19 which is curved first outward and then inward on the outer side of the passage 14 about the upper end thereof. This offset, therefore, widens the discharge passage at and around the point where it joins with the passage 15 and the traps 12 and 13. This arrangement, with the deflection of the drainage entering through the passage 16 prevents the creation of a suction action in the traps and therefore positively prevents siphoning of the traps and also prevents the discharge of the drainage into the traps.

The upper ends of the traps 12 and 13 farthest removed from the passage 14 are closed by the wall 22 with which wall the partition 17 is integral. Just below this wall 22 are laterally disposed intake openings 23 and 24 for the trap passages 12 and 13 respectively, which openings are adapted for connection with drain pipes 25 and 26 of the two bath tubs 6 and 7.

The upper ends of the passages 15 and 16 communicate with calking hubs 27 and 29 for the vent pipe 9 and continuation pipe 10 respectively, which hubs are formed integrally with the casting or body of the trap device.

It is to be noted that the upper end of the vent passage 15 is spaced several inches above the upper ends of the trap passages 12 and 13 with both of which latter said vent passages communicates. Also, the vent passage is comparatively wide. By these arrangements, and because of the extension of the partition into said passage, a free and unobstructed flow of drainage through the trap is insured and stoppage of the vent passage due to the accumulation of foreign matter at this point is positively prevented.

It will thus be seen that I have provided a simply constructed, compact double trap drain fitting which may be easily installed for highly efficient use with two bath tubs or the like, and will effect an appreciable saving in material, labor and plumbing cost as compared with installations requiring a separate drain trap device for each tub or like receptacle.

I claim:

1. A drain trap comprising a body member formed with a substantially U shaped trap passage, a downwardly extending discharge passage joined with one end of the trap passage, a vent passage extending upward from a point of communication with the trap passage and two intake openings for the trap passage, a partition in said body member dividing said trap passage into two trap chambers each of which is served by one of said intake openings, said body member having a continuation waste line passage leading into the upper end of the discharge passage, and a partition between said vent and waste passages having a laterally extended portion at its lower end to serve as a deflector.

2. A drain trap comprising a body member formed with a substantially U shaped trap passage, a downwardly extending discharge passage joined with one end of the trap passage, a vent passage extending upward from a point of communication with the trap passage and two intake openings for the trap passage, a partition in said body member dividing said trap passage into two trap chambers each of which is served by one of said intake openings, said body member having a continuation waste line passage therein leading into the upper end of the discharge passage, and a partition between the vent and waste passages formed integral with the first named partition and having a laterally extended portion provided with an inclined face arranged to deflect the drainage stream entering the waste passage, away from the discharge ends of said trap chambers.

3. A drain trap comprising a body member formed with a substantially U shaped trap passage, a downwardly extending discharge passage joined with one end of the trap passage, a vent passage extending upward from a point of communication with the trap passage and two intake openings for the trap passage and a partition in said body member dividing said trap passage into two trap chambers each of which is served by one of said intake openings, said body member having a continuation waste line passage therein leading into the upper end of the discharge passage, and means in said body for deflecting the drainage discharged from said waste line passage away from discharge ends of said trap chambers.

4. A drain trap comprising a body member formed with a substantially U shaped trap passage, a downwardly extending discharge passage joined with one end of the trap passage, a vent passage extending upward from a point of communication with the trap passage and two intake openings for the trap passage and a partition in said body member dividing said trap passage into two trap chambers each of which is served by one of said intake openings, said body member having a continuation waste line passage therein leading into the upper end of the discharge passage, a partition between said vent and waste line passages arranged to deflect the drainage stream entering through the waste line passage away from said trap chambers.

5. A drain trap comprising a body member formed with a substantially U shaped trap passage, a downwardly extending discharge passage joined with one end of the trap passage, a vent passage extending upward from a point of communication with the trap passage and two intake openings for the trap passage and a partition in said body member dividing said trap passage into two trap chambers each of which is served by one of said intake openings, said body member having a continuation waste line passage therein leading into the upper end of the discharge passage, said discharge passage being laterally enlarged at the upper end thereof.

6. A drain trap comprising a body member formed with a substantially U shaped trap passage, a downwardly extending discharge passage joined with one end of the trap passage, a vent passage extending upward from a point of communication with the trap passage and two intake openings for the trap passage and a partition in said body member dividing said trap passage into two trap chambers each of which is served by one of said intake openings, said body member having a continuation waste line passage therein leading into the upper end of the discharge passage, a partition between said vent and waste passages arranged to deflect the drainage stream entering through the waste line passage away from said trap chambers, said discharge passage being laterally enlarged and having the enlarged portion curved from its upper end first outwardly and then inwardly and terminated at a point spaced upwardly from the lower end of the discharge passage.

In testimony whereof, I have hereunto set my hand at Oakland, California, this 17th day of May, 1929.

JOHN E. EHRET.